Patented Sept. 13, 1949

2,481,765

UNITED STATES PATENT OFFICE 2,481,765

PROCESS FOR PREPARING γ-ALDOLS AND γ-KETOLS

Maurice Mainçon and Pierre Chassaing, Melle, France, assignors to Les Usines de Melle (Societe Anonyme), Saint-Leger-les-Melle, France, a company of France No Drawing. Application March 17, 1945, Serial No. 583,379. In France March 17, 1944

7 Claims. (Cl. 260—594)

This invention relates to the manufacture of γ-aldols and γ-ketols having four or more carbon atoms, from compounds which possess a tetrahydrofurane nucleus in their molecule.

It is already known to produce carbonyl compounds by oxidizing furane or derivatives thereof by means of oxygen or a gas containing oxygen, and to subject the resulting peroxide to decomposition or rearrangement, possibly with hydrogenation.

Our invention mainly differs from the prior method in its dealing with compounds having a tetrahydrofurane nucleus instead of a furane nucleus. As a matter of fact, we have found that saturation of double bonds in furane by means of hydrogen results in an extraordinary enhancement of autoxidation capacity of those compounds which possess said nucleus. Thus, for instance, the rate of oxygen absorption is 20 times larger than in the case of above mentioned furane compounds, so that for a given output, the size of the apparatus may be reduced. Oxidation reaction starts from 25° C. It is favoured by an increase of temperature. Thus, for instance, at 50° C. it is 35 times faster than at 25° C. Metal salts commonly used as oxidation catalysts such as cobalt, nickel, manganese, copper and like acetates are also found substantially to accelerate reaction; exposure to light is likewise favourable.

The peroxide thus obtained may easily be isolated from excess tetrahydrofurane compound by evaporation at a low temperature. By decomposing the peroxide, there is obtained a product which has a carbonyl group and a hydroxy group in relative γ-position; it will be either a γ-ketol or a γ-aldol according to the position of the substituent radical or radicals with respect to the oxygen atom in the original tetrahydrofurane nucleus. Tetrahydrofurane itself always yields an aldol.

The peroxide may be decomposed either through hydrolysis in acid or alkaline medium or through careful hydrogenation, hydrogen peroxide in the first case and water in the second case being produced besides ketol or aldol. Still more simply it is possible to subject said peroxide to a moderately increasing temperature in order to produce its spontaneous decomposition with evolution of oxygen in statu nascendi. As the decomposition is exothermic, it proceeds with acceleration and in order to keep it at a proper rate, one is led to cool after reaction has started, for adjusting temperature to a constant value.

The aforesaid manner of decomposition by means of heat is particularly advantageous because peroxide may be decomposed pari passu with its formation in the very oxidation bath of the tetrahydrofurane derivative: it is only necessary to keep the reactant mixture at a temperature above 40° C. Heat evolved as a consequence of decomposition is sufficient to maintain the temperature of the reactant mixture without any extraneous heat supply. On the contrary, one often is led to cool for keeping temperature at the proper value. The reaction product is then distilled with a view to recovering unaltered starting material; ketol or aldol generally admixed with an amount of peroxide is obtained as a residue.

The foregoing process may advantageously be performed in a continuous run, which is particularly advisable when working on a commercial scale. To this end, one continually withdraws from the reaction vessel a mixture containing unconverted tetrahydrofurane derivative which is easily driven off by distillation, ketol or aldol and a more or less large proportion of peroxide which may be either returned to the reaction vessel, or decomposed into ketol or aldol by heating, hydrolysis or hydrogenation.

The following examples which have no limitative character will show how this invention may be carried out.

*Example 1.*—100 litres of tetrahydrofurane together with 0.1 per cent of a mixture of cobalt acetate and nickel acetate by equal parts was stirred at 20° C. in an atmosphere of oxygen, fresh oxygen being blown into the vessel as absorption took place. After 10 hours, 2 cubic meters of oxygen were absorbed. Excess tetrahydrofurane was then driven off by evaporation at a low temperature and as a residue we obtained 9,200 g. of peroxide which were converted into 7,800 g. of butyraldol-1:4 when heated to 50° C.

*Example 2.*—200 litres of 2-methyltetrahydrofurane together with 0.2 per cent of manganese acetate were stirred at 70° C. in an atmosphere of oxygen. After 10 hours, the amount of absorbed oxygen was 12 cubic meters. The reaction product contained besides excess 2-methyltetrahydrofurane, 40 kg. of acetopropyl alcohol (or pentanolone) and 21 kg. of peroxide; the latter might be hydrolyzed into 13.8 kg. of acetopropyl alcohol when boiled for an hour in the presence of a normal solution of sulphuric acid.

*Example 3.*—300 litres of 2-methyltetrahydrofurane were placed in a vessel having a capacity of 400 litres and provided with heating and cooling means, then oxygen was introduced as required while the temperature was kept at 70°

C. by a cold water stream. When the vessel content had reached a state of equilibrium, 20 litres of 2-methyltetrahydrofurane per hour were supplied thereto; while the bath was still maintained at about 70° C., the absorption of oxygen was found to amount to 1800 litres per hour. 20 litres per hour of reactant liquid were withdrawn in a continuous manner from the bath; they contained 6 kg. of acetopropyl alcohol and 2 litres of 2-methyltetrahydrofurane peroxide which were returned to the vessel together with unconverted methyltetrahydrofurane.

*Example 4.*—In the same vessel as in Example 3, operated in a continuous fashion, 250 litres of 2:5-dimethyltetrahydrofurane were placed, and air was introduced as required while cooling in order to keep the temperature in the neighborhood of 100° C. When the mixture was in equilibrium, 13 litres per hour of 2:5-dimethyltetrahydrofurane were introduced; 4.5 cubic meters of air per hour were also delivered to the mixture, while a blow off was made to expel nitrogen (3.6 cubic meters of nitrogen and 100 litres of oxygen per hour). 800 litres of oxygen were thus absorbed and 13 litres of mixture withdrawn per hour; said mixture containing, dissolved in dimethyltetrahydrofurane, 3 kg. of hexanolone-2:5 and 1.3 kg. of dimethyltetrahydrofurane-peroxide which might be treated as above set forth, for conversion into ketol.

Our process is applicable not only to methyl derivatives of tetrahydrofurane but also to its ethyl, propyl, isopropyl and like derivatives. It is also possible to use as a starting material a tetrahydrofurane compound having one or more aromatic nuclei as substituents.

It is within the scope of our invention to work at a subatmospheric or superatmospheric pressure.

What we claim is:

1. A process for preparing a γ-hydroxy-oxo aliphatic compound, which comprises oxidizing a tetrahydrofurane compound of the class consisting of tetrahydrofurane and alkyl substituted tetrahydrofuranes at a temperature of about 40° to about 120° C., so as to produce a mixture comprising the peroxide of said tetrahydrofurane compound, a γ-hydroxy-oxo aliphatic compound which is the decomposition product of the same peroxide, and unconverted tetrahydrofurane compound; and isolating said γ-hydroxy-oxo aliphatic compound from said mixture.

2. A process for preparing a γ-hydroxy-oxo aliphatic compound, which comprises oxidizing a tetrahydrofurane compound of the class consisting of tetrahydrofurane and alkyl substituted tetrahydrofuranes in admixture with a small proportion of an oxidation catalyst selected from the group consisting of salts of manganese, cobalt and nickel, at a temperature of about 25° to about 40° C., so as to produce a peroxide; heating said peroxide to a moderate temperature above 40° C., so as to obtain a product comprising the γ-hydroxy-oxo aliphatic compound corresponding to said peroxide; and isolating said aliphatic compound from said product.

3. The process which comprises passing a gas that contains oxygen through a tetrahydrofurane compound of the class consisting of tetrahydrofurane and alkyl substituted tetrahydrofuranes at a temperature of about 40° to about 120° C., so as to obtain a product containing a γ-hydroxy-oxo aliphatic compound; and isolating said aliphatic compound from said product.

4. A continuous process which comprises maintaining a liquid body of a tetrahydrofurane compound of the class consisting of tetrahydrofurane and alkyl substituted tetrahydrofuranes, the corresponding peroxide, and the corresponding γ-hydroxy-oxo aliphatic compound, at a temperature of about 40° to about 120° C., the relative proportions of said tetrahydrofurane compound, peroxide and aliphatic compound being those which are in equilibrium at said temperature; continuously supplying a gas that contains oxygen and further amounts of said tetrahydrofurane compound to said body, in the required relative proportion for conversion of the tetrahydrofurane compound thus supplied to the corresponding peroxide; continuously withdrawing liquid from said body; and separating said γ-hydroxy-oxo compound from the liquid thus withdrawn.

5. The process of claim 4, wherein the last step comprises distilling said liquid to remove peroxide and tetrahydrofurane compound therefrom and obtain said aliphatic compound.

6. A process for preparing a γ-hydroxy-oxo aliphatic compound; which comprises heating a mixture of water and a peroxide of the class consisting of tetrahydrofurane peroxide and alkyl substituted tetrahydrofurane peroxides, at a temperature of about 40° to about 120° C., said mixture having a pH-value other than 7, so as to obtain a mixture comprising water and the γ-hydroxy-oxo aliphatic compound corresponding to said peroxide; and isolating said aliphatic compound from the last named mixture.

7. A process for preparing a γ-hydroxy-oxo aliphatic compound, which comprises boiling a dilute acid solution of a peroxide of the class consisting of tetrahydrofurane peroxide and alkyl substituted tetrahydrofurane peroxides, so as to obtain an aqueous solution of γ-hydroxy-oxo aliphatic compound corresponding to said peroxide; and isolating said aliphatic compound from the last named solution.

MAURICE MAINÇON.
PIERRE CHASSAING.

REFERENCES CITED

The following references are of record in the file of this patent:

UNITED STATES PATENTS

| Number | Name | Date |
|---|---|---|
| 2,115,206 | Milas | Apr. 26, 1938 |

FOREIGN PATENTS

| Number | Country | Date |
|---|---|---|
| 532,158 | Great Britain | Jan. 17, 1941 |